May 9, 1933.  S. W. CRAWFORD  1,908,122
JOURNAL BEARING
Filed May 9, 1932
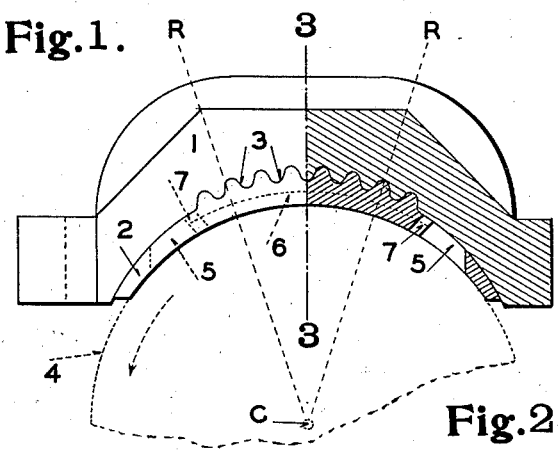
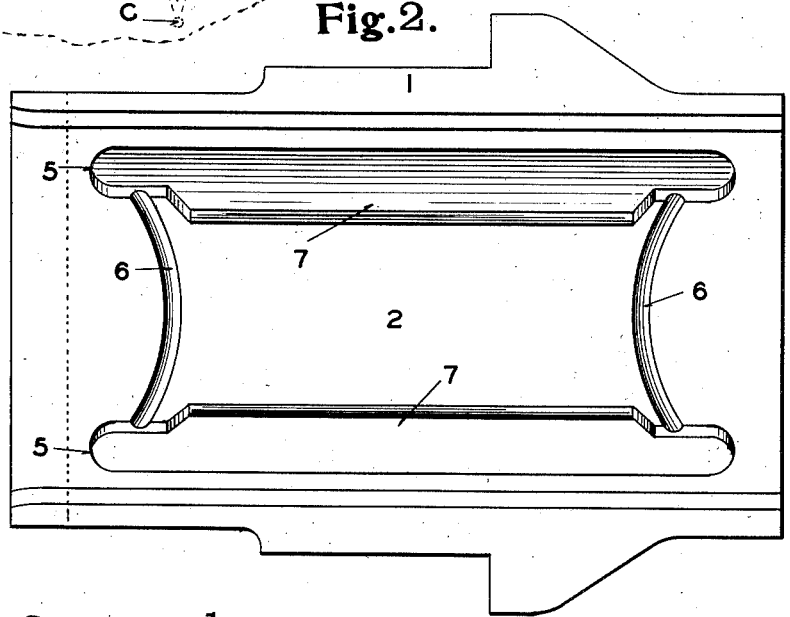
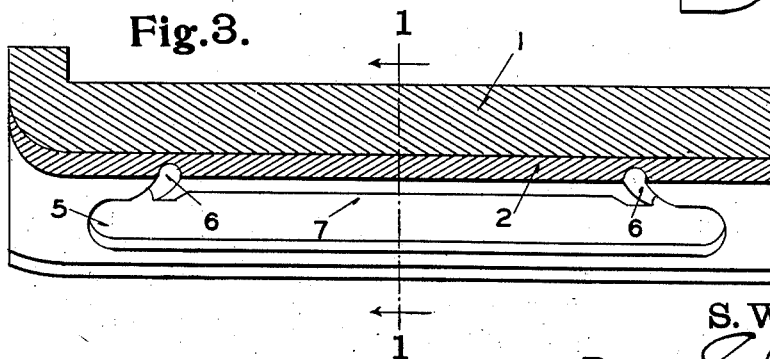
Inventor
S. W. Crawford
By
Att'y.

Patented May 9, 1933

1,908,122

UNITED STATES PATENT OFFICE

SAMUEL W. CRAWFORD, OF ST. LOUIS, MISSOURI, ASSIGNOR TO NATIONAL BEARING METALS CORPORATION, OF ST. LOUIS, MISSOURI, A CORPORATION OF NEW YORK

JOURNAL BEARING

Application filed May 9, 1932. Serial No. 610,128.

My invention relates to that type of bearing in which the non-rotary bearing member, commonly termed a "brass" although it may be made of other metal, only partially surrounds the rotary member or journal and is provided with an attached lining of softer material, such as Babbitt metal, forming the wearing face contacting with the journal.

In bearings of this type, as heretofore made, much trouble has been experienced due to the lining becoming wholly or partially detached from the brass as a result of the high temperature and shock to which it is subjected during use. When the bearing becomes loosened through only a limited area, such area usually becomes cracked or checked with the result that the lubricating oil, which is under high pressure between the bearing surfaces, enters between the lining and the brass. The pressure of this oil, together with the resultant loss of heat conductivity between the lining and the brass, eventually results in the complete detachment of the lining and consequent disabling of the bearing. Difficulty is also encountered in securing uniform lubrication of the wearing surfaces and in preventing the entrance between such surfaces of portions of the oil retaining packing with the consequent formation of "waste grabs" which interfere with the proper action of the journal and cause abnormally high temperatures.

One object of my invention is to provide improved bonding means, between the brass and the lining of a bearing of the type referred to, so as not only to increase the mechanical strength of the attachment but at the same time to facilitate the transfer of heat from the lining to the brass, thus doubly protecting the bearing from liability to injury by heating and shock.

Another object of my invention is to provide improved means for securing uniform distribution of the lubricant and at the same time provide means for intercepting and holding portions of the fibrous packing material which gain access between the bearing surfaces.

In the accompanying drawing, which illustrates one form of journal bearing made in accordance with my invention, Figure 1 is an end view, partly in elevation and partly in section, on the line 1—1 of Figure 3; Figure 2 is a bottom plan view; and Figure 3 is a longitudinal section taken on the line 3—3 of Figure 1.

The body 1 of the non-rotary member of the bearing, hereinafter termed the "brass", may be of any suitable form. As shown in the drawing, it is of the standard A. R. A. type used in railway journal boxes. Carried on the concave lower face of the brass is the lining 2 of Babbitt or similar soft metal which is applied to the surface after it has been tinned so as to adhere firmly thereto. In the central part of the surface, I form a number of longitudinal grooves 3, preferably in the form of rounded fluting, as shown. Thus I greatly increase the contact area between the lining and the brass and so increase the mechanical strength of the bond and facilitate the transfer of heat, generated by the friction of the bearing surfaces, from the lining to the brass. The curvature of the lower face of the lining is made to conform to a standard size of journal but the axle to which it is applied may be appreciably under size, in which case contact between the axle and brass is restricted to the central portion of the latter. Even when the curvature of the lining conforms accurately to the periphery of the axle 4 (shown in dotted lines in Figure 1), I find that the major portion of the load is carried upon the portion of the bearing face subtended by radial planes R passing from the center C of the axle through the side edges of the flat top of the brass. This portion of the bearing is, therefore, subjected to the greatest rise of temperature and the greatest amount of shock and the desired result is accomplished if this area is provided with my improved bonding means. I prefer, however, to extend the fluting somewhat beyond these planes, as shown in Figure 1.

In addition to the functions of my improved bonding means above described, it has the further advantage of presenting alternate strips of Babbitt metal and brass to the axle after the main body of the lining is completely worn away. Further, my form of bonding does not cause material weakening of the brass, such as results from the use of anchoring lugs or the like.

To provide means for securing uniform lubrication of the parts, I form in the lining adjacent the edges thereof, a pair of longitudinal oil passages 5, said passages preferably extending entirely through the lining as shown. These oil passages are connected adjacent their ends by channels 6. The channels are curved in form to avoid the formation of ridges in the axle and their convex sides project inwardly so as to carry the oil toward the longitudinal center of the bearing, thus counteracting the tendency of the oil to escape at the ends of the bearing. The inner sides of each of the passages 5 are recessed to form an oil pocket 7.

In operation, the oil applied to the axle by the packing, is carried into one or the other of passages 5, according to the direction of rotation of the axle. If the axle is rotating in the direction indicated by the arrow in Figure 1, the oil will be carried into the right hand passage 5 and will accumulate in the pocket 7 of this passage until the latter is filled, after which it will escape through the channels 6 into the other passage and thence return to the packing. As one of the pockets remain full of oil at all times during the running of the car, uniform lubrication is secured whether or not the oil is evenly applied to the periphery of the axle. At the same time the oil-filled pocket acts as a trap to catch and hold any fragments of waste which may pass between the edge of the bearing and the axle, due either to lack of conformity of the curvature of the bearing surfaces or to tipping of the brass on the axle caused by sudden starting or stopping of the car or excessive brake pressure.

Having fully described my invention, what I claim as new and desire to secure by Letters Patent of the United States is:

1. In a device of the class described, a non-rotary bearing member adapted to partially surround a journal, a soft metal lining adherent to the curved face of said member, said lining being provided adjacent its edges with a pair of longitudinal openings extending through the lining and forming oil passages, each of said oil passages being provided on its inner side with a recess forming an oil pocket, and a pair of channels connecting the ends of said passages beyond the pockets, said channels extending only partially through the lining.

2. In a device of the class described, a non-rotary bearing member adapted to partially surround a journal, said member being provided at one side of its center line with an oil pocket, a side wall of said pocket being provided at one end with a shoulder, and a channel for surplus oil leading from a point exterior to said shoulder and discharging the surplus at the other side of the center line.

3. In a device of the class described, a non-rotary bearing member adapted to partially surround a journal, said member being provided at one side of its center line with an oil pocket extending along the major portion of the length of the member, and a channel for conveying oil to the other side of the member, said channel communicating with the pocket at a point farther from the center of the member than the inner wall of the pocket, whereby a predetermined amount of oil is maintained in the pocket during the operation of the bearing.

In testimony whereof, I hereunto affix my signature, this 5th day of May, 1932.

SAMUEL W. CRAWFORD.